(No Model.)

J. J. MAHONEY.
PULLEY BUSHING.

No. 381,151. Patented Apr. 17, 1888.

WITNESSES:
Robert A. Knight.
Charles F. Aldrich.

INVENTOR.
John J. Mahoney.

N. PETERS. Photo-Lithographer, Washington, D. C.

UNITED STATES PATENT OFFICE.

JOHN JOSEPH MAHONEY, OF HOLDEN, MASSACHUSETTS.

PULLEY-BUSHING.

SPECIFICATION forming part of Letters Patent No. 381,151, dated April 17, 1888.

Application filed December 10, 1887. Serial No. 257,504. (No model.)

*To all whom it may concern:*

Be it known that I, JOHN JOSEPH MAHONEY, a citizen of the United States, residing at Holden, in the county of Worcester and Commonwealth of Massachusetts, have invented a new and useful Improvement in Pulley-Bushings, of which the following is a specification.

The object of my invention is to provide a peculiarly-constructed bushing for the hub of pulleys and similar structures, by the use of which a pulley may be secured upon a shaft of any diameter without other operation of adapting the pulley to the shaft than inserting a bushing of proper dimensions.

The hub of the pulley must be bored out larger than the largest shaft upon which it is to be placed, and the practice of inserting a bushing in such hubs to reduce the size of the bore to fit a given shaft is elementary and presents no novelty; but, whereas to insert and remove a plain driven bushing is a matter of so much practical difficulty that it is frequently cheaper to get a new pulley when a change is to be made, with my improved bushing it becomes a simple matter to change a pulley from one diameter of shaft to another, and this without practical obstacles or objections. It is desirable in practice to sometimes make up a lot of pulleys to be put upon shafts of unknown diameters, and again in certain situations it is desirable to apply the same pulley to different shafts. To meet these requirements in a simple and practical way is the object of my invention.

Figure 1:
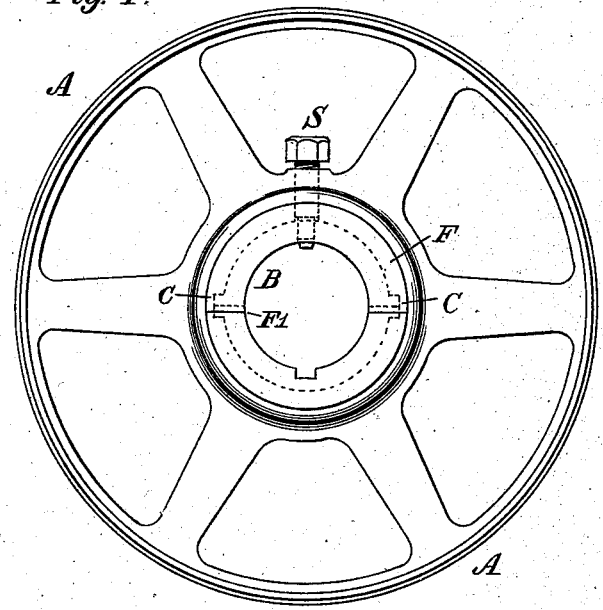
Figure 2:
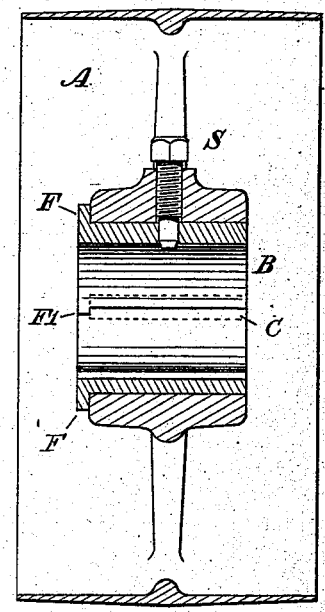
Figure 3:
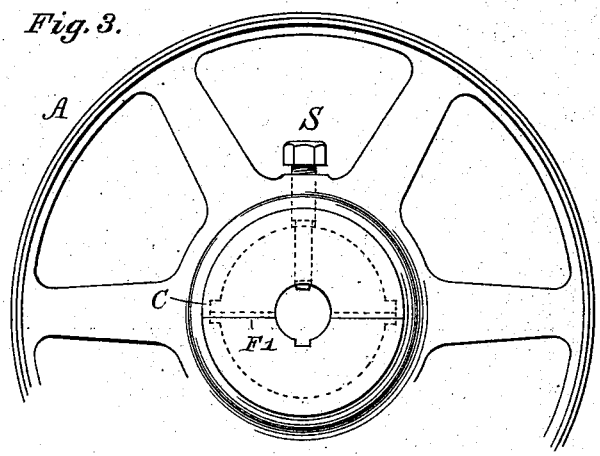
Figure 5:
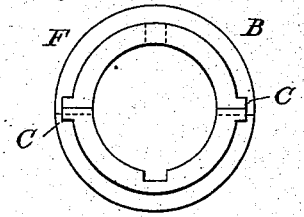

The construction and application of the bushing are illustrated by the drawings, Figures 1 and 3 being side elevations of a pulley with bushings in place; Fig. 2, a cross-section of Fig. 1, and Figs. 4, 5, and 6 detail views of the bushing alone.

A represents an ordinary pulley having a hub large enough to receive the bushing of sufficient diameter to fit the largest shaft the pulley is to be put upon. The hub is bored out and splined upon opposite sides, forming two keyways or channels on the inside of the hub. The bushing is made in halves, or what is technically known as a "split bushing," each half being provided with a tongue, C, so formed that when the halves are put together in proper relation they form a single tongue of such dimensions as to fit the keyway planed on the inside of the hub, as before described, and as clearly shown in Figs. 1 and 3. The bushing is further provided upon one side with a flange, F, the line of parting of which does not coincide with the plane of parting of the halves, as is indicated by F' in the several figures. The effect of this is that the flange F upon one half of the bushing forms a rabbet, F², Fig. 4, fitting into a tongue, F³, in the other half, whereby the one half is prevented from sliding longitudinally along the other.

It is evident that if the described bushing be inserted in the hub of a pulley, as described, it is only necessary to confine the one half of the bushing having the tongue F² against sliding longitudinally out of the hub to confine the whole bushing fixedly and firmly within the hub—a condition essential to practical success in use. This I attain by a set-screw, S, which is threaded in the hub and has an unthreaded portion entering a corresponding hole drilled in the bushing, thus preventing any end movement of the latter. The set-screw may not only enter the bushing and serve to secure it within the hub, as aforedescribed, but may project through the bushing and indent the shaft, thereby fixing the pulley to the shaft, as well as securing the bushing. A set-screw adapted to this last-described purpose is shown in the drawings.

The bushing may be provided with a keyway, as shown, and the pulley secured to the shaft by a key therein, either in combination with the set screw or screws, or without, in the usual manner, provided always there shall be the set-screw S, or an equivalent, acting to prevent the bushing from moving longitudinally in the hub.

It is clearly evident that the bushing described may be withdrawn from the hub of the pulley by turning out sufficiently the set-screw and another inserted and made secure in its place by the simplest and easiest of mechanical operations. When the bushing and set-screw are in place, the former is as rigidly secured to the pulley as though it were a part of the hub itself, the tongue C fitting the keyways, the flange F, the rabbet F² and tongue F³, and the set-screw S serving together to produce this result.

If a set of bushings be provided for each size of shaft, the pulley thus fitted may be rapidly, easily, and economically changed from one sized shaft to another, as desired; also, a lot of pulleys may be made up without regard to size of bore, to be afterward furnished with such bushing as may be required.

Figure 4:
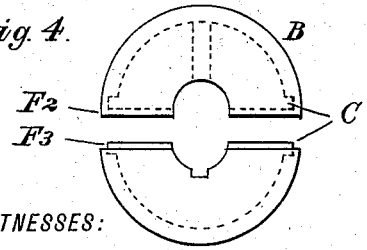
Figure 6:
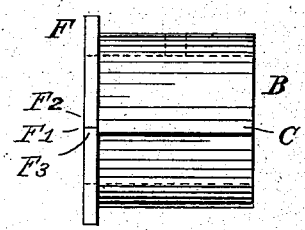

In Fig. 1 is shown a bushing with the largest-sized bore that the pulley will admit, and in Fig. 3 one with the smallest bore likely to be used. In Fig. 4 the latter bushing is shown with the halves drawn somewhat apart. A side elevation is given in Fig. 5, and an end view in Fig. 6.

The bushing, being in halves, admits of taking out and putting in others without taking the pulley off the shaft or the shaft out of its bearings. It is equally applicable to clamp-pulleys, to fly-wheels, gears, or any other structure having a hub which is placed upon a shaft. It may serve as a removable bushing for loose pulleys and other bearings requiring renewal from any cause.

In accordance with the foregoing declared and described invention, I claim—

1. The bushing composed of separable parts and having each thereof provided with a tongue, C, a flange, F, a rabbet, $F^2$, and a tongue, $F^3$.

2. The bushing composed of separable parts and having each thereof provided with a tongue, C, a flange, F, a rabbet, $F^2$, and a tongue, $F^3$, in combination with a hub or sleeve constructed to receive said bushing and a set-screw, as and for the purposes set forth.

JOHN JOSEPH MAHONEY.

Witnesses:
ROBERT A. KNIGHT,
HENRY W. KING.